(12) United States Patent
Toizumi et al.

(10) Patent No.: US 11,825,185 B2
(45) Date of Patent: Nov. 21, 2023

(54) LEARNING DEVICE, LEARNING METHOD, AND NON TRANSITORY COMPUTER-READABLE MEDIUM HAVING CONTROL PROGRAM STORED THEREON, AND ESTIMATION DEVICE

(71) Applicant: NEC Corporation, Tokyo (JP)

(72) Inventors: Takahiro Toizumi, Tokyo (JP); Ryuichi Akashi, Tokyo (JP); Yuka Ogino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 122 days.

(21) Appl. No.: 17/428,110

(22) PCT Filed: Feb. 5, 2019

(86) PCT No.: PCT/JP2019/004045
§ 371 (c)(1),
(2) Date: Aug. 3, 2021

(87) PCT Pub. No.: WO2020/161799
PCT Pub. Date: Aug. 13, 2020

(65) Prior Publication Data
US 2022/0132027 A1   Apr. 28, 2022

(51) Int. Cl.
*H04N 23/617* (2023.01)
*H04N 23/52* (2023.01)
(Continued)

(52) U.S. Cl.
CPC .......... *H04N 23/617* (2023.01); *H04N 23/52* (2023.01); *H04N 23/681* (2023.01); *H04N 23/75* (2023.01)

(58) Field of Classification Search
CPC ......... H04N 5/225; H04N 5/232; H94N 5/238
(Continued)

(56) References Cited

U.S. PATENT DOCUMENTS

2001/0052977 A1   12/2001   Toyooka
2005/0247867 A1   11/2005   Volgt et al.
(Continued)

FOREIGN PATENT DOCUMENTS

CN   101718940 A   6/2010
CN   108307153 A   7/2018
(Continued)

OTHER PUBLICATIONS

Extended European Search Report for EP Application No. 19914303.3 dated Feb. 22, 2022.
(Continued)

*Primary Examiner* — Xi Wang

(57) ABSTRACT

In a learning device (10), an optical conversion unit (11) receives light from a learning target and uses the received light to output light according to a configuration value of a parameter. A sensing unit (13) senses the light output from the optical conversion unit (11). An estimation unit (15A) forms an estimation result for an answer to a configuration problem based on the light sensed by the sensing unit (13). An update unit (15B) calculates an update value of the parameter of the optical conversion unit (11) based on the estimation result by the estimation unit (15A), and updates the configuration value of the parameter of the optical conversion unit (11) with the calculated update value. The optical conversion unit (11) includes a plurality of optical devices in which the configuration value of the parameter is set independently of each other.

13 Claims, 6 Drawing Sheets

(51) Int. Cl.
*H04N 23/75* (2023.01)
*H04N 23/68* (2023.01)

(58) Field of Classification Search
USPC .................................................. 348/345, 335
See application file for complete search history.

(56) References Cited

U.S. PATENT DOCUMENTS

| | | | | |
|---|---|---|---|---|
| 2010/0289941 | A1* | 11/2010 | Ito et al. ................ | G02B 13/16 |
| | | | | 348/345 |
| 2017/0098305 | A1* | 4/2017 | Gossow .................... | G06T 7/80 |
| 2018/0204069 | A1 | 7/2018 | Yano et al. | |

FOREIGN PATENT DOCUMENTS

| | | |
|---|---|---|
| CN | 109186657 A | 1/2019 |
| JP | 2001-228024 A | 8/2001 |
| JP | 2016-157999 A | 9/2016 |
| JP | 2017-194498 A | 10/2017 |
| JP | 2018-097407 A | 6/2018 |

OTHER PUBLICATIONS

Indian Office Action for IN Application No. 202147039166 dated Mar. 15, 2022.
International Search Report for PCT Application No. PCT/JP2019/004045, dated May 14, 2019.
CN Office Action for CN Application No. 2019800934464, dated Sep. 29, 2022 with English Translation.

\* cited by examiner

LEARNING DEVICE, LEARNING METHOD, AND NON TRANSITORY COMPUTER-READABLE MEDIUM HAVING CONTROL PROGRAM STORED THEREON, AND ESTIMATION DEVICE

This application is a National Stage Entry of PCT/JP2019/004045 filed on Feb. 5, 2019, the contents of all of which are incorporated herein by reference, in their entirety.

TECHNICAL FIELD

The present disclosure relates to a learning device, a learning method, and a non-transitory computer-readable medium having a control program stored thereon, and an estimation device.

BACKGROUND ART

An estimation device that estimates answers to various configuration problems has been proposed (for example, Patent Literature 1). A configuration problem of a device disclosed in Patent Literature 1 is to acquire a light field. Specifically, a light field acquisition device disclosed in Patent Literature 1 controls setting of a coded aperture shape of a coded aperture portion (that is, an optical conversion unit) based on an evaluation value obtained by comparing restored light field data restored from an image signal with reference light field data. This enables the light field acquisition device disclosed in Patent Literature 1 to acquire the light field of a scene having a data amount less than the number of pixels of an image element with high resolution.

CITATION LIST

Patent Literature

[Patent Literature 1] Japanese Unexamined Patent Application Publication No. 2016-157999

SUMMARY OF INVENTION

Technical Problem

The present inventors have found that it is possible to implement an estimation device that can more accurately estimate answers to configuration problems by including, in an optical conversion unit, a plurality of optical devices in which a configuration value of a parameter is set independently of each other. The present inventors propose a learning device that learns the configuration value of the parameter that is set in the plurality of optical devices.

Objects of the present disclosure are to provide a learning device and a learning method that can learn a configuration value of a parameter set in a plurality of optical devices in an estimation device that can more accurately estimate answers to configuration problems, and to provide a non-transitory computer-readable medium having a control program stored thereon and the estimation device.

Solution to Problem

A learning device according to a first aspect includes:
optical conversion means for receiving light from a learning target and using the received light to output light according to a configuration value of a parameter;
sensing means for sensing the light output from the optical conversion means;
estimation means for forming an estimation result for an answer to a configuration problem based on the sensed light; and
update means for calculating an update value of the parameter based on the estimation result by the estimation means and updating the configuration value of the parameter with the calculated update value,
wherein the optical conversion means includes a plurality of optical devices in which the configuration value of the parameter is set independently of each other.

An estimation device according to a second aspect includes:
optical conversion means for using input light to output light according to a configuration value of a parameter;
sensing means for sensing the light output from the optical conversion means; and
estimation means for forming an estimation result for an answer to a configuration problem based on the sensed light,
wherein the optical conversion means includes a plurality of optical devices in which the configuration value of the parameter is set independently of each other.

A learning method according to a third aspect includes:
forming an estimation result for an answer to a configuration problem based on light output from optical conversion means which receives light from a learning target and includes a plurality of optical devices and according to a configuration value of a parameter set in the optical conversion means;
calculating an update value of the parameter based on the estimation result; and
updating the configuration value of the parameter with the calculated update value.

A non-transitory computer-readable medium according to a fourth aspect stores a control program configured to cause a learning device to perform processes of:
forming an estimation result for an answer to a configuration problem based on light output from optical conversion means which receives light from a learning target and includes a plurality of optical devices and according to a configuration value of a parameter set in the optical conversion means;
calculating an update value of the parameter based on the estimation result; and
updating the configuration value of the parameter with the calculated update value.

Advantageous Effects of Invention

According to the present disclosure, it is possible to provide the learning device and the learning method that can learn a configuration value of a parameter set in a plurality of optical devices in an estimation device that can more accurately estimate answers to configuration problems, and to provide the non-transitory computer-readable medium having a control program stored thereon and the estimation device.

DESCRIPTION OF EMBODIMENTS

Hereinafter, example embodiments will be described with reference to the drawings. In the example embodiments, the same or equivalent elements are assigned the same reference signs and duplicate description is omitted.

First Example Embodiment

Figure 1:
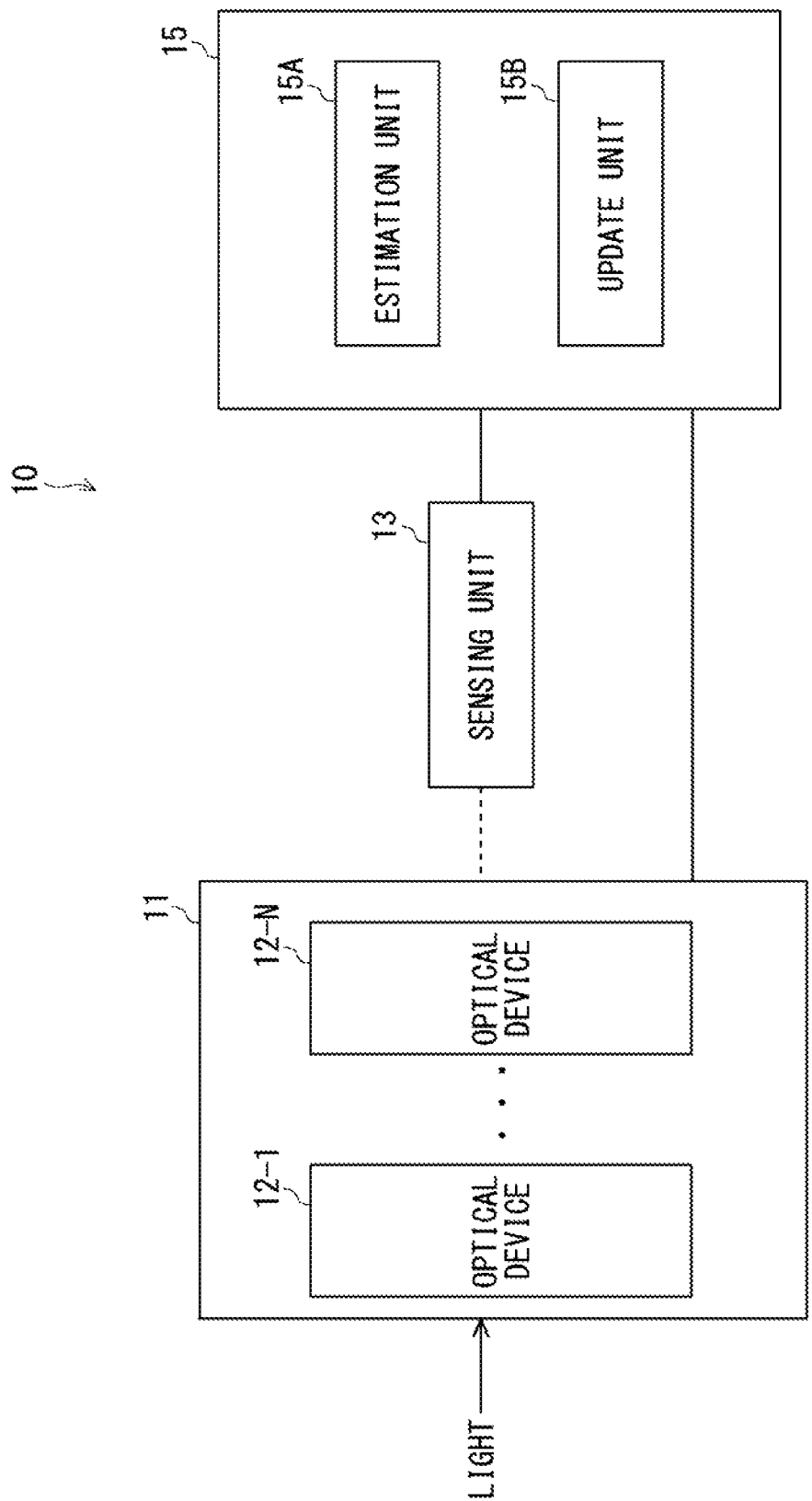
FIG. 1 is a block diagram showing an example of a learning device in a first example embodiment.

FIG. 1 is a block diagram showing an example of a learning device in a first example embodiment. In FIG. 1, a learning device 10 includes an optical conversion unit 11, a sensing unit 13, and a control unit (control device) 15.

The optical conversion unit 11 receives (inputs) light from a learning target (for example, a learning image), and uses the received (input) light to output light according to a configuration value of a parameter. For example, the optical conversion unit 11 includes optical devices 12-1 to 12-N (N is a natural number of two or more) in which the configuration value of the parameter is set independently of each other. Hereinafter, when the optical devices 12-1 to 12-N are not distinguished from each other, the optical devices 12-1 to 12-N may be collectively referred to as optical devices 12 simply. The optical devices 12-1 to 12-N may be the same type of optical devices as each other, or may include multiple types of optical devices. For example, the optical conversion unit 11 performs, as processing for the received (input) light, at least one of attenuation processing, amplification processing, condensing processing, diffusion processing, light wave strengthening and combining processing, moire generation processing, stereoscopic processing, and polarization extraction processing.

The sensing unit 13 senses the light output from the optical conversion unit 11. The sensing unit 13 is, for example, an image sensor. That is, the sensing unit 13 converts the sensed light into an electric signal and outputs the obtained electric signal to a control unit 15. Note that in FIG. 1, the optical conversion unit 11 and the sensing unit 13 are connected to each other by a dotted line and the dotted line means an optical path.

The control unit 15 includes an estimation unit 15A and an update unit 15B.

The estimation unit 15A forms an estimation result for an answer to a configuration problem based on the light sensed by the sensing unit 13. The configuration problem is, for example, image recognition, object detection, segmentation, abnormality detection, image generation, image conversion, image compression, light field generation, or three-dimensional image generation. That is, the estimation unit 15A is a functional unit that executes image analysis processing according to the configuration problem. For example, when the configuration problem is to recognize a red object, the estimation unit 15A forms and outputs "1" as the estimation result if a learning image includes an image of a red object, whereas the estimation unit 15A forms and outputs "0" as the estimation result if the learning image does not include an image of a red object. In addition, for example, when the configuration problem is to generate a light field, the estimation unit 15A forms and outputs a light field as the estimation result.

The update unit 15B calculates an update value of the parameter of the optical conversion unit 11 based on the estimation result by the estimation unit 15A, and updates the configuration value of the parameter of the optical conversion unit 11 with the calculated update value.

As described above, according to the first example embodiment, in the learning device 10, the optical conversion unit 11 receives (inputs) light from the learning target, and uses the received (input) light to output light according to the configuration value of the parameter. The sensing unit 13 senses the light output from the optical conversion unit 11. The estimation unit 15A forms an estimation result for the answer to the configuration problem based on the light sensed by the sensing unit 13. The update unit 15B calculates an update value of the parameter of the optical conversion unit 11 based on the estimation result by the estimation unit 15A, and updates the configuration value of the parameter of the optical conversion unit 11 with the calculated update value. The optical conversion unit 11 includes the optical devices 12-1 to 12-N (N is a natural number of two or more) in which the configuration value of the parameter is set independently of each other.

By the configuration of the learning device 10, it is possible to learn the configuration value of the parameter set in a plurality of optical devices in an estimation device (not shown) including the same plurality of optical devices as the optical devices 12-1 to 12-N (N is a natural number of two or more), a sensing unit, and an estimation unit. Because the estimation device (not shown) can use light containing more information for estimation processing by the plurality of optical devices, as compared with a case where the number of optical devices is one, the estimation device (not shown) can more accurately estimate the answer to the configuration problem. That is, according to the learning device 10, it is possible to learn the configuration value of the parameter set in the plurality of optical devices in the estimation device that can more accurately estimate the answer to the configuration problem. Note that in the estimation device (not shown), a hardware neural network can be implemented by the plurality of optical devices. Therefore, an amount of calculation by the estimation unit of the estimation device (not shown) can be reduced, and so the estimation device (not shown) can be also applied to an edge terminal with inferior processing capability.

Second Example Embodiment

A second example embodiment relates to a more specific example embodiment.

<Configuration Example of Learning Device>

Figure 2:
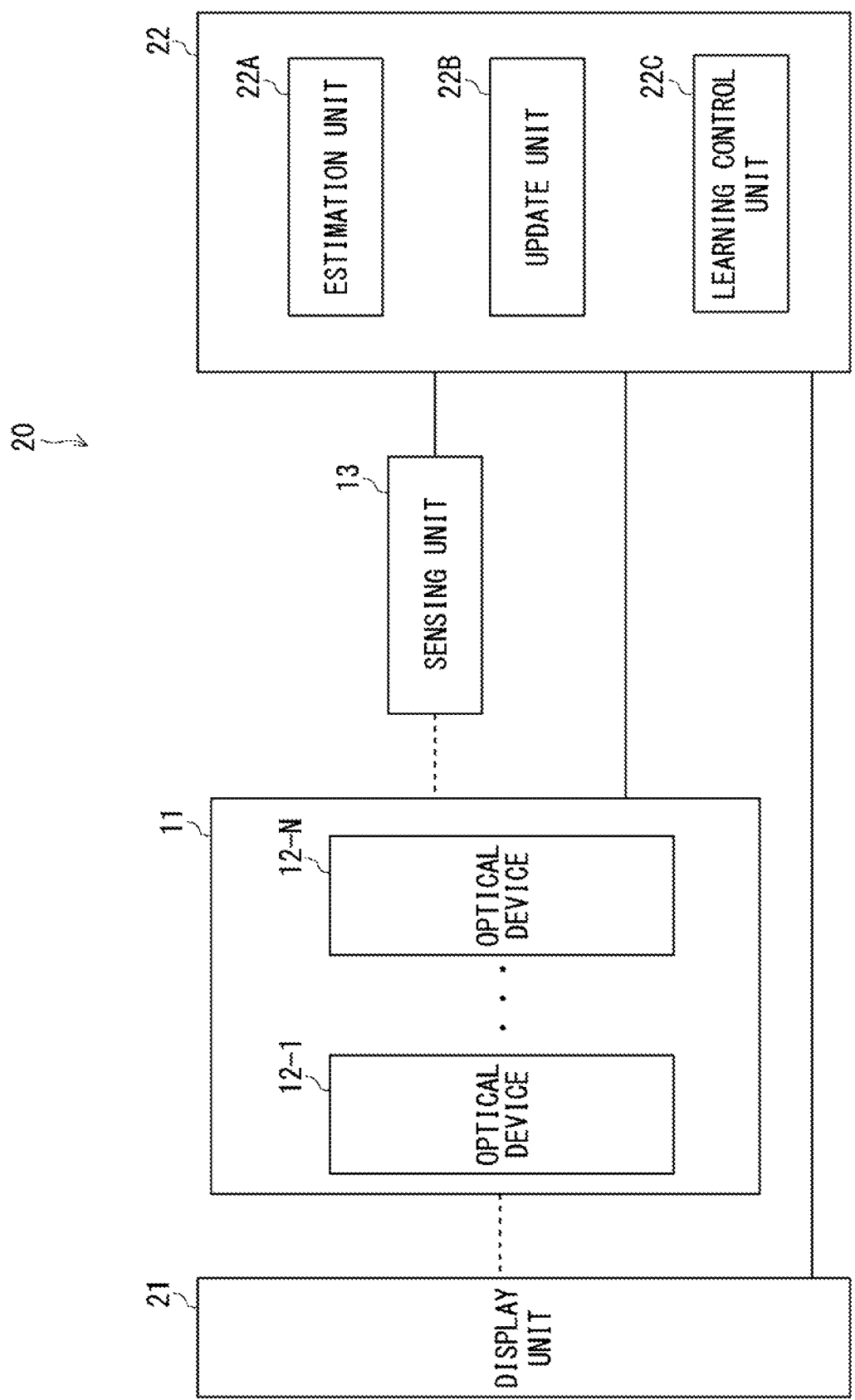
FIG. 2 is a block diagram showing an example of a learning device in a second example embodiment.

FIG. 2 is a block diagram showing an example of a learning device in a second example embodiment. In FIG. 2, a learning device 20 includes an optical conversion unit 11, a sensing unit 13, a display unit 21, and a control unit (control device) 22. The control unit 22 includes an estimation unit 22A, an update unit 22B, and a learning control unit 22C.

The display unit 21 displays a learning image under control by the learning control unit 22C. This causes light corresponding to the learning image to be input to the optical conversion unit 11. Note that in FIG. 2, the display unit 21 and the optical conversion unit 11 are connected to each other by a dotted line and the dotted line means an optical path.

The optical conversion unit 11 includes optical devices 12-1 to 12-N (N is a natural number of two or more) as described in the first example embodiment. Here, as an example, the optical devices 12-1 to 12-N include a liquid crystal device, and description will be made as the optical device 12-1 is assumed to be the liquid crystal device.

The optical device 12-1 includes, for example, a first polarizing plate, a second polarizing plate whose polarization direction is rotated by 90° from that of the first polarizing plate, a color filter, and a liquid crystal unit sandwiched between the first polarizing plate and the second polarizing plate. By controlling an electric signal (that is, a configuration value of a parameter) applied to the liquid crystal unit, for example, transmittance of the liquid crystal unit can be controlled. This control can perform control on a pixel-by-pixel basis of the liquid crystal unit. That is, the liquid crystal device can output light in which an optical characteristic according to the configuration value of the parameter is emphasized on the pixel-by-pixel basis.

Alternatively, the optical device 12-1 has a liquid crystal unit. By controlling an electric signal (that is, a configuration value of a parameter) applied to the liquid crystal unit, a spiral structure of the liquid crystal in the liquid crystal unit may be controlled, and a wavelength of light selectively reflected may be controlled. This control can perform control on the pixel-by-pixel basis of the liquid crystal unit. That is, the liquid crystal device can output light in which the optical characteristic according to the configuration value of the parameter is emphasized on the pixel-by-pixel basis.

In the optical device 12, for example, in addition to the liquid crystal device or in place of the liquid crystal device, a liquid lens, a deformable mirror, a microchannel plate type photomultiplier tube, or the like may be used. The liquid lens is a device whose focus can be adjusted by an electric signal. The deformable mirror is a device whose reflection direction can be controlled by an electric signal. The microchannel plate type photomultiplier tube is a device that converts incident light into electrons inside the device and amplifies the electrons inside to output light stronger than the incident light.

The learning control unit 22C controls learning of the configuration value of the parameter in the optical conversion unit 11. For example, the learning control unit 22C switches a learning image displayed on the display unit 21. The learning control unit 22C may use a parameter value obtained by an optical simulation as an initial value of the parameter in learning processing of the configuration value of the parameter in the optical conversion unit 11. This allows fine tuning of the parameter value obtained by the optical simulation to be performed. In this case, for example, the learning control unit 22C may simulate using optical models obtained by modeling each of the optical devices 12-1 to 12-N, calculate a gradient by an error back-propagation method, and optimize a parameter of the optical models. This value of the parameter is used as the above initial value. Note that when the estimation unit 22A includes a neural network, the learning control unit 22C may control learning of the neural network.

The estimation unit 22A forms an estimation result for an answer to a configuration problem based on the light sensed by the sensing unit 13 as in the estimation unit 15A of the first example embodiment. The estimation unit 22A includes, for example, the neural network.

The update unit 22B calculates the gradient using an objective function regarding an error between the estimation result by the estimation unit 22A and a correct answer. Then, the update unit 22B calculates an update value of the parameter based on the calculated gradient, and updates the configuration value of the parameter of the optical conversion unit 11 with the calculated update value. The update unit 22B may update the parameter (weight or bias) of the neural network included in the estimation unit 22A. For gradient calculation in update processing of the parameter (weight or bias) of the neural network included in the estimation unit 22A, the error back-propagation method used in learning of the neural network can be used.

Since a light input/output phenomenon in the optical conversion unit 11 occurs outside the control unit 22 (that is, a computer), the error back-propagation method used in the learning of the neural network cannot be used. Consequently, the update unit 22B uses random numbers to form a perturbation vector, and uses the objective function regarding the error between the estimation result by the estimation unit 22A and the correct answer and the formed perturbation vector to calculate the gradient. Then, the update unit 22B calculates the update value of the parameter based on the calculated gradient, and updates the configuration value of the parameter of the optical conversion unit 11 with the calculated update value.

In this gradient calculation, a parameter vector is represented by "p" and its random number perturbation vector is represented by "e." When the entire neural network of the optical conversion unit 11 is $f(x, p)$, the update unit 22B calculates $f(x, p)$ and $f(x, p+e)$ for an input image batch x. In general gradient calculation, since the gradient is obtained by independently performing calculation for a scalar value $p_i$ of each element of the parameter vector p, the same number of operations as the number of elements of the parameter is required. On the other hand, in calculation by random number perturbation, since the perturbation e is calculated by a vector, the number of operations is only two. Instead, the update unit 22B generates the perturbation vector e with random numbers. For example, the update unit 22B calculates the random numbers using Bernoulli distribution. As a result, each element of the perturbation vector e takes a value of −1 or 1. The update unit 22B can control differential width for the gradient calculation by multiplying "e" by a hyper parameter a. For the random numbers, the same random numbers may be used in each iteration, or different random numbers may be used in each iteration. The random number perturbation can be applied to not only a vector but also a matrix, and a tensor of third and higher floors. For the update of the gradient, for example, a stochastic gradient descent method, Adam, or the like may be used. For the calculation of the random numbers, uniform distribution with 0 as the average or Gaussian distribution may be used in addition to Bernoulli distribution.

<Operation Example of Learning Device>

Figure 3:
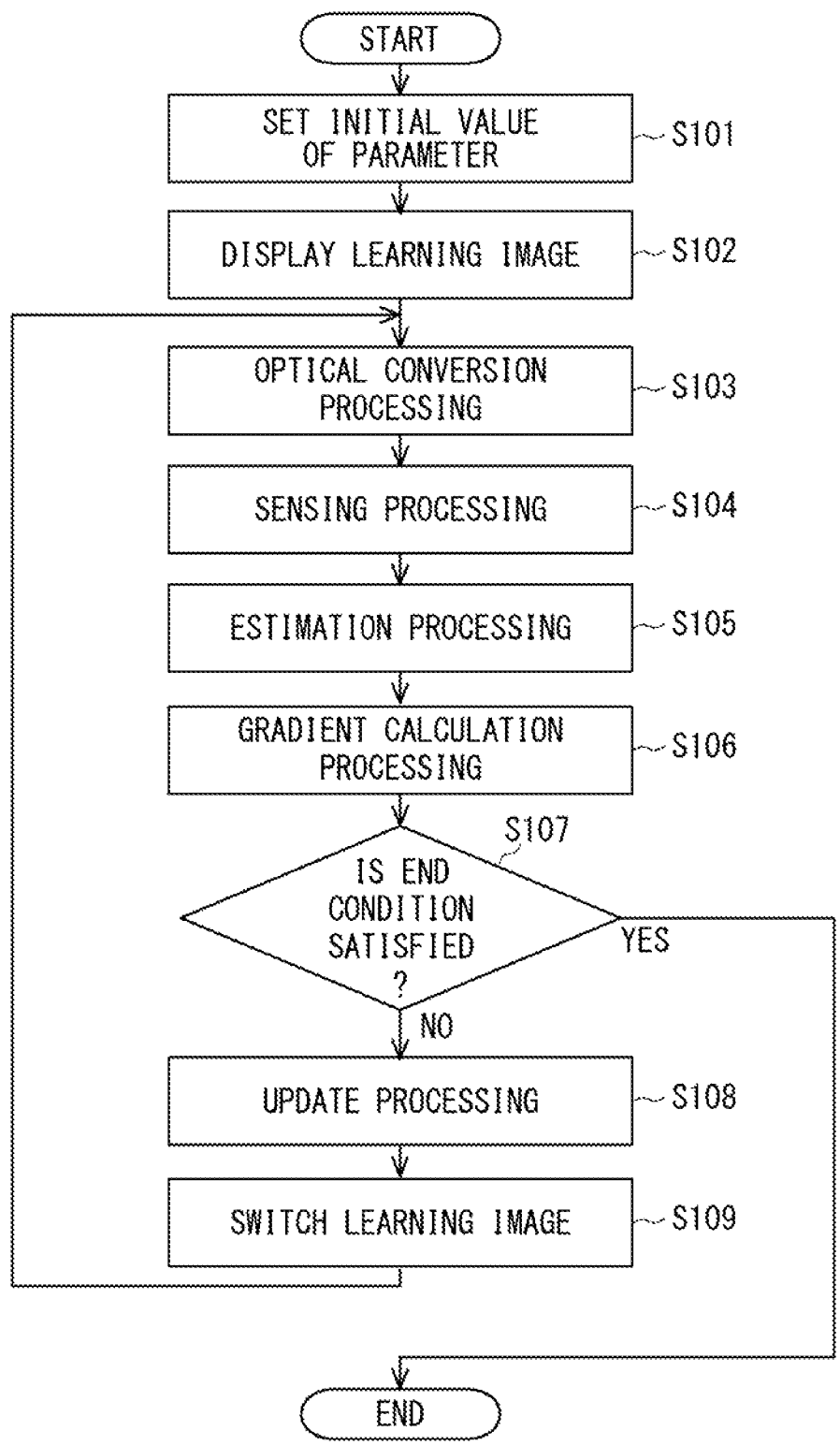
FIG. 3 is a flowchart showing an example of processing operation of the learning device in the second example embodiment.

An example of processing operation of the learning device 20 having the above configuration will be described. FIG. 3 is a flowchart showing an example of processing operation of the learning device in the second example embodiment.

The learning control unit 22C sets an initial value of the parameter for the optical conversion unit 11 (step S101). As described above, the parameter value obtained by the optical simulation may be used as the initial value of the parameter.

The learning control unit 22C causes the display unit 21 to display the learning image (step S102). This makes light corresponding to the learning image to be input to the optical conversion unit 11.

The optical conversion unit 11 receives (inputs) light from the learning image, and uses the received (input) light to output light according to the configuration value of the parameter (step S103).

The sensing unit 13 senses the light output from the optical conversion unit 11 (step S104).

The estimation unit 15A forms an estimation result for the answer to the configuration problem based on the light sensed by the sensing unit 13 (step S105).

The update unit 22B uses the objective function regarding the error between the estimation result by the estimation unit 22A and the correct answer to calculate the gradient (step S106).

The learning control unit 22C determines whether or not an end condition is satisfied (step S107). For example, if a sign of the gradient calculated this time by the update unit 22B is different from a sign of the gradient calculated previous time, it can be regarded as reaching the minimum value (or a local minimum value) of the objective function, so the learning control unit 22C determines that the end condition is satisfied. When the end condition is satisfied (step S107 YES), a processing flow ends.

When the end condition is not satisfied (step S107 NO), the learning control unit 22C causes the update unit 22B to calculate an update value of the parameter based on the calculated gradient and update the configuration value of the parameter of the optical conversion unit 11 with the calculated update value (step S108).

The learning control unit 22C switches the learning image and causes the display unit 21 to display the switched image (step S109).

Note that in the above description, description has been made on the premise of learning for each single image, but the description is not limited to this, and batch learning or mini-batch learning may be performed.

Third Example Embodiment

In the above second example embodiment, the description has been made on the premise that all the optical devices 12-1 to 12-N are made to be parameter update target devices at one timing. On the other hand, a third example embodiment relates to an example embodiment in which an update target device is sequentially switched among the optical devices 12-1 to 12-N.

Figure 4:
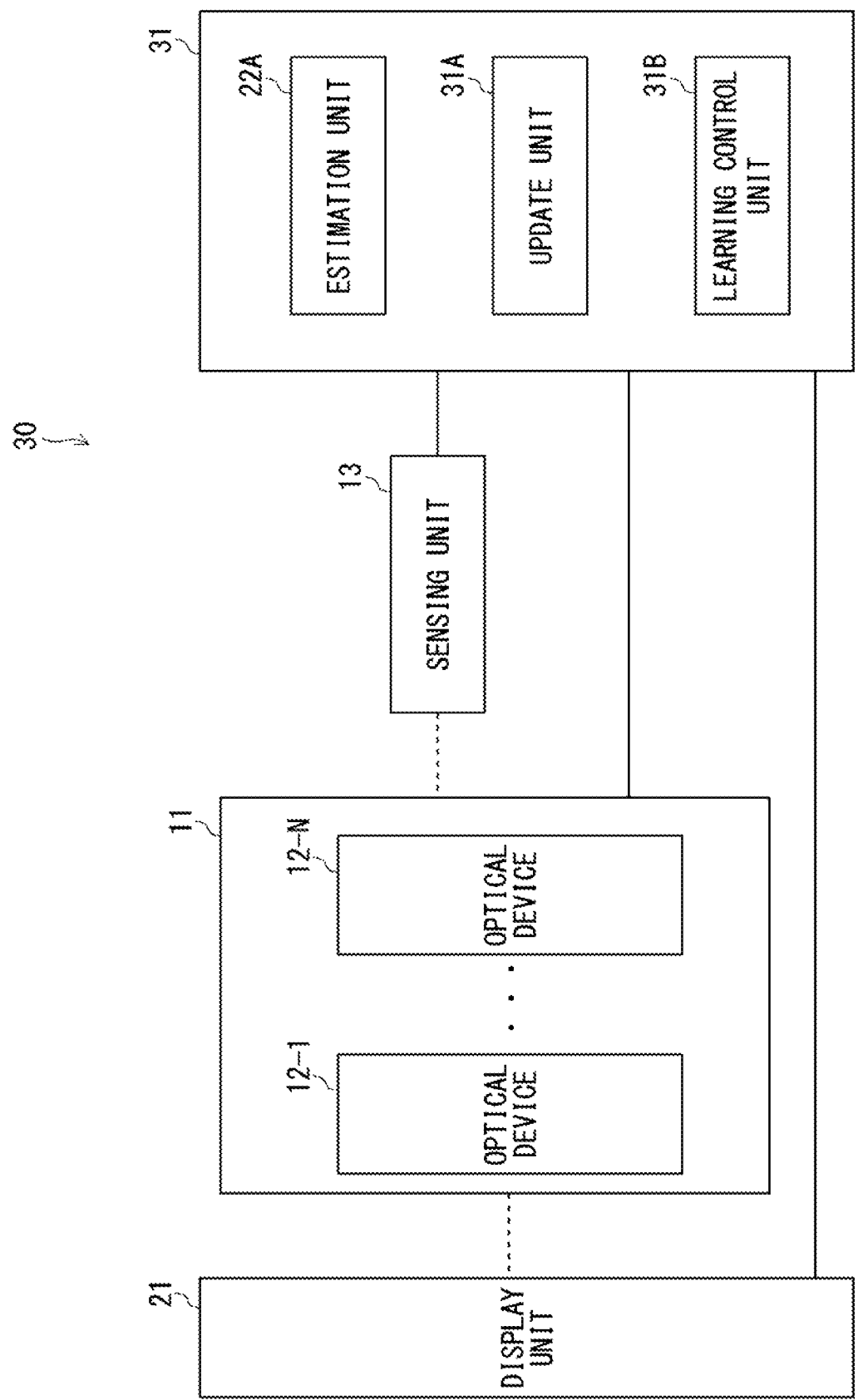
FIG. 4 is a block diagram showing an example of a learning device in a third example embodiment.

FIG. 4 is a block diagram showing an example of a learning device in the third example embodiment. In FIG. 4, a learning device 30 includes a control unit (control device) 31. The control unit 31 includes an update unit 31A and a learning control unit 31B.

The learning control unit 31B sequentially switches the update target device among the optical devices 12-1 to 12-N, switches a learning image displayed on the display unit 21 according to switching of the update target device, and causes the update unit 31A to update a configuration value of a parameter for each update target device.

Here, all the optical devices 12-1 to 12-N are assumed to be liquid crystal devices. Then, the learning control unit 31B selects the update target device among the optical devices 12-1 to 12-N. The learning control unit 31B sets the configuration value of the parameter of the optical devices 12-1 to 12-N other than the update target device so as to be the maximum transmittance. Then, the learning control unit 31B causes the update unit 31A to calculate a gradient for the update target device by the error back-propagation method using an objective function regarding an error between an estimation result by the estimation unit 22A and a correct answer. Here, since the configuration value of the parameter of the optical devices 12 other than the update target device is set as to be the maximum transmittance, light output from the optical conversion unit 11 can be regarded as not being affected by the optical devices 12 other than the update target device. Therefore, since input and output of the update target device can be quantified, the error back-propagation method can be used for calculation of the gradient. The learning control unit 31B optimizes the parameter of one update target device, then switches the update target device, and advances learning of the parameter of the switched update target device. That is, here, the parameters of the optical devices 12-1 to 12-N are learned in the manner of optimizing stacked auto-encoders.

Note that the learning control unit 31B may advance batch learning for one update target device, and when the batch learning is completed, randomly select an optical device 12 that has not yet been learned as a next update target device, and advance learning for the selected update target device.

Fourth Example Embodiment

A fourth example embodiment relates to an estimation device in which the parameter value learned by the learning devices described in the first example embodiment to the third example embodiment is set.

Figure 5:
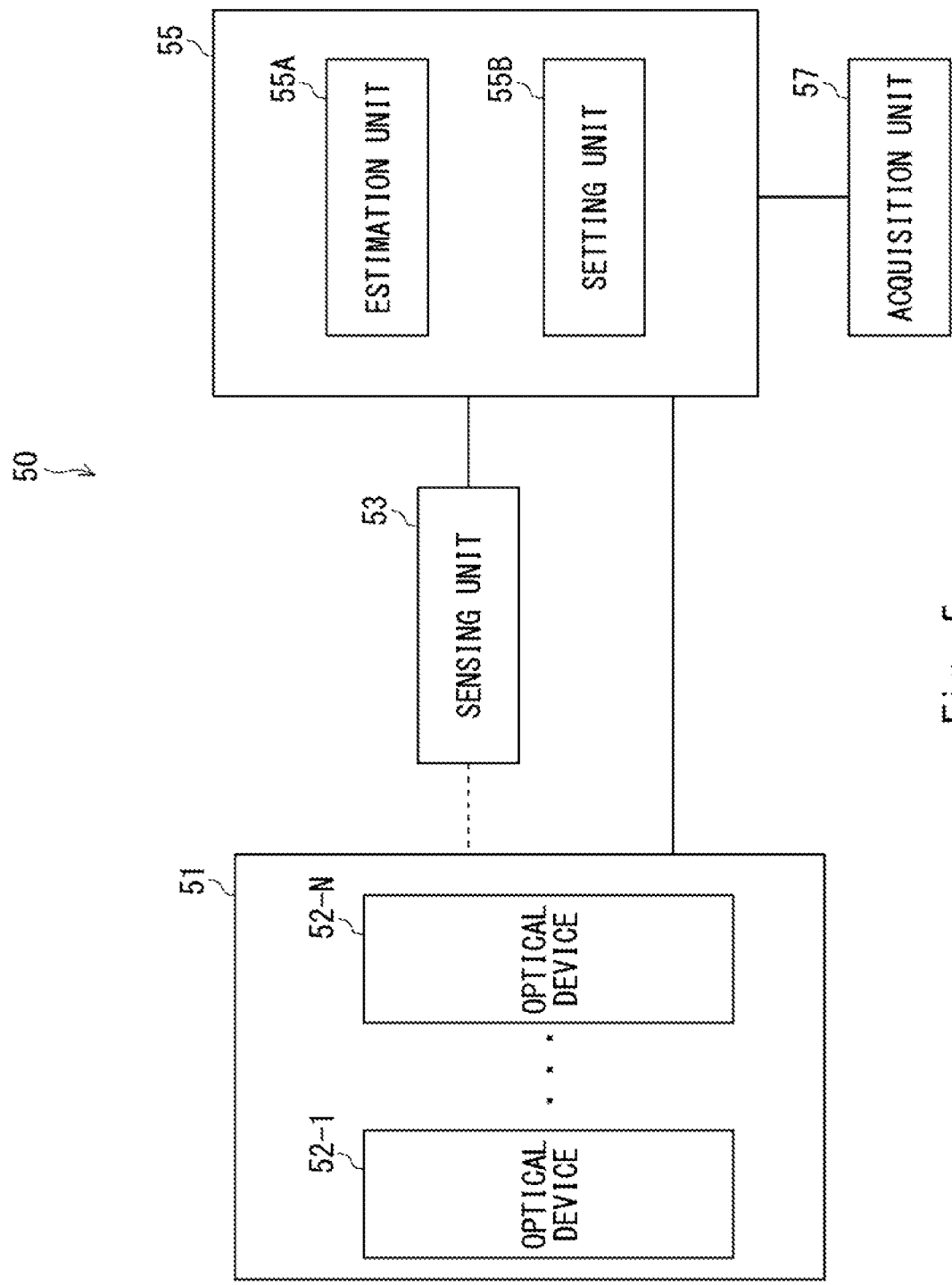
FIG. 5 is a block diagram showing an example of an estimation device in a fourth example embodiment.

FIG. 5 is a block diagram showing an example of an estimation device in the fourth example embodiment. In FIG. 5, an estimation device 50 includes an optical conversion unit 51, a sensing unit 53, a control unit (control device) 55, and an acquisition unit 57.

The optical conversion unit 51 uses received (input) light to output light according to a configuration value of a parameter. The optical conversion unit 51 includes optical devices 52-1 to 52-N (N is a natural number of two or more) in which the configuration value of the parameter is set independently of each other. The optical devices 52-1 to 52-N correspond to the optical devices 12-1 to 12-N of the first example embodiment to the third example embodiment, respectively, and the parameter value learned by the learning device 10, 20, or 30 is set. That is, the optical conversion unit 51 has a configuration as in the optical conversion unit 11 of the first example embodiment to the third example embodiment.

The sensing unit 53 senses the light output from the optical conversion unit 51. That is, the sensing unit 53 has a configuration as in the sensing unit 13 of the first example embodiment to the third example embodiment.

The control unit 55 includes an estimation unit 55A and a setting unit 55B.

The estimation unit 55A forms an estimation result for an answer to a configuration problem based on the light sensed by the sensing unit 53. That is, the estimation unit 55A has the same configuration as the estimation units 15A and 22A of the first example embodiment to the third example embodiment.

The setting unit 55B sets the parameter value acquired by the acquisition unit 57 for the optical devices 52-1 to 52-N of the optical conversion unit 51.

The acquisition unit 57 acquires the parameter value learned by the learning device 10, 20, or 30. The acquisition unit 57 may be a communication unit that acquires the parameter value from the learning device 10, 20, or 30 by wired communication or wireless communication. Alternatively, the acquisition unit 57 may be an interface unit to which cable connecting the estimation device 50 and the learning device 10, 20, or 30 is connected. By the acquisition unit 57 acquiring the parameter value learned by the learning device 10, 20, or 30, for example, the parameter value to be set for the optical devices 52-1 to 52-N can be downloaded. Since the optical devices in this example embodiment are outside a computer, the parameter value is set when the devices are shipped, and the parameter can be disabled from being directly accessed in an edge terminal. This makes it impossible to hack the parameter of the edge terminal.

As described above, according to the fourth example embodiment, in the estimation device 50, the optical conversion unit 51 uses the received (input) light to output the light according to the configuration value of the parameter. The sensing unit 53 senses the light output from the optical conversion unit 51. The estimation unit 55A forms the estimation result for the answer to the configuration problem based on the light sensed by the sensing unit 53. The optical conversion unit 51 includes the optical devices 52-1 to 52-N (N is a natural number of two or more) in which the configuration value of the parameter is set independently of each other.

In the configuration of the estimation device 50, since the optical conversion unit 51 includes the optical devices 52-1 to 52-N in which the configuration value of the parameter is set independently of each other, light containing more information can be used for estimation processing by the plurality of optical devices, as compared with a case where there is one optical device. As a result, the estimation device 50 can more accurately estimate the answer to the configuration problem. Because a hardware neural network can be implemented by the optical devices 52-1 to 52-N, an amount of calculation by the estimation unit 55A can be reduced. This makes it possible to apply the estimation device 50 to an edge terminal with inferior processing capability.

OTHER EXAMPLE EMBODIMENTS

<1> The optical conversion units 11 and 51 of the first example embodiment to the fourth example embodiment may switch the configuration value of the parameter from a first configuration value to a second configuration value within an exposure time of the sensing units 13 and 53. For example, the optical conversion unit 11 switches between a state of setting the parameter value updated by the update unit 15B, 22B, or 31A for all the optical devices 12-1 to 12-N, and a state in which the parameter value of some optical devices of the optical devices 12-1 to 12-N is switched so as to be the maximum transmittance, within the exposure time of the sensing unit 13. This allows the sensing unit 13 to express an image in which images in the two states are added. That is, an add layer in the neural network can be expressed by this operation. Alternatively, instead of addition, the images in the above two states may be arranged side by side in the sensing unit 13. This allows a concatenate layer in the neural network to be expressed. According to such a method, skip connection used in U-net or the like becomes possible. The same applies to the optical conversion unit 51 and the sensing unit 53.

Figure 6:
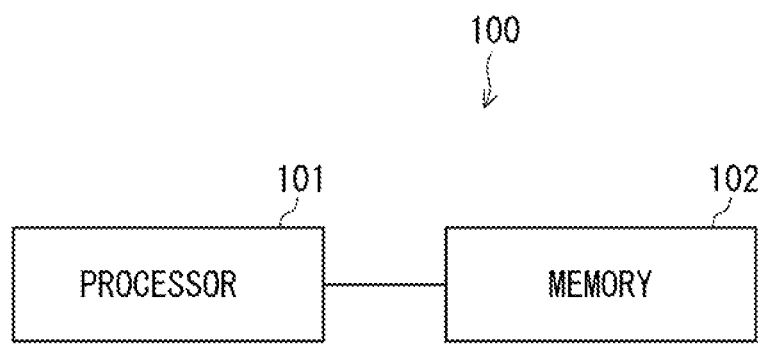
FIG. 6 is a diagram showing a hardware configuration example of a control device.

<2> FIG. 6 is a diagram showing a hardware configuration example of a control device. In FIG. 6, a control device 100 includes a processor 101 and a memory 102. The processor 101 may be, for example, a microprocessor, an MPU (Micro Processing Unit), or a CPU (Central Processing Unit). The processor 101 may include a plurality of processors. The memory 102 is composed of a combination of a volatile memory and a nonvolatile memory. The memory 102 may include a storage disposed away from the processor 101. In that case, the processor 101 may access the memory 102 via an I/O interface (not shown).

The control devices (control units) 15, 22, 31, and 55 of the first example embodiment to the fourth example embodiment can each have a hardware configuration shown in FIG. 6. The estimation units 15A, 22A, and 55A, the update units 15B, 22B, and 31A, the learning control units 22C and 31B, and the setting unit 55B of the control devices 15, 22, 31, and 55 of the first example embodiment to the fourth example embodiment may be implemented by the processor 101 reading and executing a program stored in the memory 102. The program can be stored using various types of non-transitory computer-readable media and supplied to the control devices 15, 22, 31, and 55. Examples of the non-transitory computer-readable media include magnetic recording media (for example, flexible disk, magnetic tape, and hard disk drive) and magneto-optical recording media (for example, magneto-optical disk). Furthermore, the examples of the non-transitory computer-readable media include a CD-ROM (Read Only Memory), a CD-R, and a CD-R/W. Furthermore, the examples of the non-transitory computer-readable media include semiconductor memories. The semiconductor memories include, for example, a mask ROM, a PROM (Programmable ROM), an EPROM (Erasable PROM), a flash ROM, and a RAM (Random Access Memory). The program may be supplied to the control devices 15, 22, 31, and 55 by various types of transitory computer-readable media. Examples of the transitory computer-readable media include an electric signal, an optical signal, and an electromagnetic wave. The transitory computer-readable media can supply the program to the control devices 15, 22, 31, and 55 via a wired communication path, such as an electric wire and an optical fiber, or a wireless communication path.

Although the invention of the present application has been described above with reference to the example embodiments, the invention of the present application is not limited by the above. Various changes that can be understood by those skilled in the art can be made within the scope of the invention for the configurations and details of the invention of the present application.

Part or all of the above example embodiments can be described as in the following supplementary notes, but are not limited to the following.

(Supplementary Note 1)

A learning device comprising:
  optical conversion means for receiving light from a learning target and using the received light to output light according to a configuration value of a parameter;
  sensing means for sensing the light output from the optical conversion means;
  estimation means for forming an estimation result for an answer to a configuration problem based on the sensed light; and
  update means for calculating an update value of the parameter based on the estimation result by the estimation means and updating the configuration value of the parameter with the calculated update value,
  wherein the optical conversion means includes a plurality of optical devices in which the configuration value of the parameter is set independently of each other.

(Supplementary Note 2)

The learning device according to Supplementary note 1, further comprising learning control means for sequentially switching an update target device among the plurality of optical devices, switching the learning target according to switching of the update target device, and causing the update means to update the configuration value of the parameter for each update target device.

(Supplementary Note 3)

The learning device according to Supplementary note 2, wherein the learning control means controls batch learning for each update target device, and randomly selects the update target device from the plurality of optical devices.

(Supplementary Note 4)

The learning device according to Supplementary note 2 or 3, wherein the update means calculates a gradient by an error back-propagation method using an objective function regarding an error between the estimation result by the estimation means and a correct answer, calculates an update value of the parameter based on the calculated gradient, and updates the configuration value of the parameter with the calculated update value.

(Supplementary Note 5)

The learning device according to Supplementary note 1, wherein the update means uses a random number to form a perturbation, uses an objective function regarding an error between the estimation result by the estimation means and a correct answer and the formed perturbation to calculate a gradient, calculates an update value of the parameter based on the calculated gradient, and updates the configuration value of the parameter with the calculated update value.

(Supplementary Note 6)

The learning device according to any one of Supplementary notes 1 to 5, wherein
the plurality of optical devices include a liquid crystal device, and
the update means updates the configuration value of the parameter on a pixel-by-pixel basis of the liquid crystal device.

(Supplementary Note 7)

The learning device according to Supplementary note 6, wherein the liquid crystal device outputs light in which an optical characteristic according to the configuration value of the parameter is emphasized on the pixel-by-pixel basis.

(Supplementary Note 8)

The learning device according to any one of Supplementary notes 1 to 7, wherein the optical conversion means switches the configuration value of the parameter from a first configuration value to a second configuration value within an exposure time of the sensing means.

(Supplementary Note 9)

The learning device according to any one of Supplementary notes 1 to 8, wherein
the estimation means includes a neural network, and
the update means further updates a parameter of the neural network.

(Supplementary Note 10)

The learning device according to any one of Supplementary notes 1 to 9, wherein a parameter value obtained by an optical simulation is used as an initial value of the configuration value of the parameter in learning processing.

(Supplementary Note 11)

The learning device according to any one of Supplementary notes 1 to 10, wherein the optical conversion means performs, as processing for the received light, at least one of attenuation processing, amplification processing, condensing processing, diffusion processing, light wave strengthening and combining processing, moire generation processing, stereoscopic processing, and polarization extraction processing.

(Supplementary Note 12)

The learning device according to any one of Supplementary notes 1 to 11, wherein the configuration problem is image recognition, object detection, segmentation, abnormality detection, image generation, image conversion, image compression, light field generation, or three-dimensional image generation.

(Supplementary Note 13)

An estimation device comprising:
optical conversion means for using received light to output light according to a configuration value of a parameter;
sensing means for sensing the light output from the optical conversion means; and
estimation means for forming an estimation result for an answer to a configuration problem based on the sensed light,
wherein the optical conversion means includes a plurality of optical devices in which the configuration value of the parameter is set independently of each other.

(Supplementary Note 14)

A learning method comprising:
forming an estimation result for an answer to a configuration problem based on light output from optical conversion means which receives light from a learning target and includes a plurality of optical devices and according to a configuration value of a parameter set in the optical conversion means;
calculating an update value of the parameter based on the estimation result; and
updating the configuration value of the parameter with the calculated update value.

(Supplementary Note 15)

A non-transitory computer-readable medium storing a control program configured to cause a learning device to perform processes of:
forming an estimation result for an answer to a configuration problem based on light output from optical conversion means which receives light from a learning target and includes a plurality of optical devices and according to a configuration value of a parameter set in the optical conversion means;
calculating an update value of the parameter based on the estimation result; and
updating the configuration value of the parameter with the calculated update value.

REFERENCE SIGNS LIST

10 Learning device
11 Optical conversion unit
12 Optical device
13 Sensing unit
15 Control unit (control device)
15A Estimation unit
15B Update unit
20 Learning device
21 Display unit
22 Control unit (control device)
22A Estimation unit
22B Update unit
22C Learning control unit
30 Learning device
31 Control unit (control device)
31A Update unit
31B Learning control unit
50 Estimation device
51 Optical conversion unit 53 Sensing unit
55 Control unit (control device)
55A Estimation unit
55B Setting unit
57 Acquisition unit

What is claimed is:

1. A learning device comprising:
    a plurality of optical devices that each have a configuration value of a parameter and that are configured to receive light and output the light according to the configuration value;
    a sensor configured to sense the light output from the optical devices;
    at least one processor; and
    and at least one memory storing instructions executable by the at least one processor to control the configuration value by:
    forming an estimation result for an answer to a configuration problem based on the sensed light;
    calculating an update value of the parameter based on a gradient that is calculated by using an objective function regarding an error between the estimation result and an answer; and
    calculating the configuration value of the parameter using the calculated update value.

2. The learning device according to claim 1, wherein instructions are executable by the at least one processor to further:
    sequentially switch an update target device among the plurality of optical devices;
    switch a learning target according to switching of the update target device; and
    update the configuration value of the parameter for the update target device.

3. The learning device according to claim 2, wherein the instructions are executable by the at least one processor to further:
    control batch learning for the update target device; and
    randomly select the update target device from the plurality of optical devices.

4. The learning device according to claim 2, wherein the instructions are executable by the at least one processor to further:
    calculate the gradient by an error back-propagation method.

5. The learning device according to claim 1, wherein the instructions are executable by the at least one processor to further:
    use a random number to form a perturbation by a random number; and
    calculate the gradient by using the objective function and the formed perturbation.

6. The learning device according to claim 1, wherein
    the plurality of optical devices include a liquid crystal device, and
    the instructions are executable by the at least one processor to update the configuration value of the parameter on a pixel-by-pixel basis of the liquid crystal device.

7. The learning device according to claim 6, wherein the liquid crystal device outputs light in which an optical characteristic according to the configuration value of the parameter is emphasized on the pixel-by-pixel basis.

8. The learning device according to claim 1, wherein the instructions are executable by the at least one processor to switch the configuration value of the parameter from a first configuration value to a second configuration value within an exposure time of the sensor.

9. The learning device according to claim 1, wherein the instructions are executable by the processor to
    update a parameter of a neural network.

10. The learning device according to claim 1, wherein a parameter value obtained by optical simulation is used as an initial value of the configuration value of the parameter in learning processing.

11. The learning device according to claim 1, wherein the optical devices perform, as processing for the received light, at least one of attenuation processing, amplification processing, condensing processing, diffusion processing, light wave strengthening and combining processing, moire generation processing, stereoscopic processing, and polarization extraction processing.

12. The learning device according to claim 1, wherein the configuration problem is image recognition, object detection, segmentation, abnormality detection, image generation, image conversion, image compression, light field generation, or three-dimensional image generation.

13. A learning method comprising:
    forming, by a processor, an estimation result for an answer to a configuration problem based on light output according to a configuration value of a parameter from a plurality of optical devices that receive light and output light;
    calculating, by the processor, an update value of the parameter based on a gradient that is calculated by using an objective function regarding an error between the estimation result and an answer; and
    calculating, by the processor, the configuration value of the parameter using the calculated update value.

* * * * *